Patented Dec. 24, 1935

2,025,044

UNITED STATES PATENT OFFICE 2,025,044

APPLICATION OF NEW ORGANIC ETHERS

Henry Dreyfus, London, England

No Drawing. Application October 20, 1932, Serial No. 638,775. In Great Britain November 5, 1931

9 Claims. (Cl. 8—20)

This invention relates to the manufacture of new organic ethers and to their application in the arts.

In my U. S. application S. No. 640,529 filed October 31, 1932, I have described how glycerine and other trihydric alcohols or mixtures thereof with glycols and/or aldehydes or ketones may be treated with dehydrating agents so as to produce cyclic ether compounds. I have now found that similar results may be achieved with tetrahydric or other polyhydric alcohols, for example erythrite, sorbitol, mannitol and in general the reduction products of sugars. Any suitable dehydrating agents may be used, as for example sulphuric acid, hydrochloric acid, phosphoric acid, zinc chloride, benzene sulphonic acid, calcium chloride and other agents having a relatively high avidity for water. The above agents may be used to effect the condensation at relatively low temperatures, but less powerful dehydrating agents may be used at high temperatures.

As in my U. S. application S. No. 640,529, mixtures of the tetrahydric or other polyhydric alcohols with glycols and/or aldehydes or ketones and also with trihydric alcohols, such as glycerine, may be treated in accordance with the invention. For example ethylene glycol, propylene glycol, 1.2 or 2.3-butylene glycol, iso-butylene glycol, formaldehyde, acetaldehyde, acrolein or acetone may be used.

In most cases the cyclic ethers produced in accordance with the present invention are hydroxy bodies and they may be esterified or etherified, for instance by treatment with methylating, ethylating, benzylating, acetylating, formylating, or lactylating agents. Any suitable method of bringing about the condensation may be employed, for example those employed in the production of cyclic ethers from glycols and glycerine, in which connection reference is made to U. S. application S. No. 640,529. Thus a solution or suspension of the polyhydroxy alcohol in a suitable medium may be treated with a dehydrating agent, preferably at elevated temperatures, especially when condensing a polyhydric alcohol with itself or with a glycol or glycerine. For example, a suspension of glucose or erythritol in acetone may be saturated with hydrochloric acid and allowed to stand at normal or increased temperatures until the condensation product of the polyhydroxy alcohol and acetone is formed. The hydrochloric acid is removed by shaking the liquid with powdered lead carbonate, filtering off the precipitate, and on evaporation of the filtrate the acetone compound crystallizes out and may be separated.

I find that the new cyclic ethers and also the etherified and esterified hydroxy cyclic ethers form a valuable series of softening or plasticizing agents for a large variety of organic products and notably for resins, both natural and artificial, and cellulose esters and ethers. Of the resins which may be softened or plasticized with the said compounds I may mention shellac, dammar, the phenol-aldehyde fusible and soluble synthetic resins, both in the Novolak and Resol stage, and similar resins from other starting materials, for instance from diphenylolpropane and formaldehyde and other aldehydes, from urea or thiourea and formaldehyde, from glycerine or other polyhydric alcohol and phthalic acid or other polycarboxylic acid, and also the polymerized vinyl resins, for example polymerized vinyl acetate.

However, the most important application of the substances of the present invention is their utilization as softening or plasticizing agents for cellulose acetate, cellulose nitrate and other esters or ethers of cellulose. They may be employed as such in the manufacture of spinning solutions for producing artificial filaments, ribbons, films, foils, sheets and the like by dry or wet methods, for the manufacture of dopes, varnishes and lacquers, and also in the manufacture of plastics and moulding powders and moulded articles.

They may further be employed in wet spinning processes, both in the actual coagulating baths, as described in U. S. Patent No. 1,467,493 and U. S. applications S. Nos. 402,785 filed 26th October, 1929, and 418,414 filed 3rd January, 1930, in subsequent treatment baths and/or in the spinning solution, as in U. S. application S. No. 402,785.

In the above applications the agents of the present invention may be employed with other solvents and/or diluents, for example acetone, methyl acetone, methyl acetate, ethyl acetate, butyl acetate, ethers and esters and ether-esters of olefine and poly-olefine glycols, for example the mono-methyl and ethyl ethers of ethylene and propylene glycols, glycol mono-acetate, ethyl glycol mono-acetate and methyl glycol mono-acetate, methylene chloride, ethylene chloride, dichlorethylene, trichlorethylene, chloroform, methyl, ethyl and other alcohols, hydrocarbons, and ethers, e. g. isopropyl ether. Acetaldehyde or other very low boiling solvents may be used when it is desired to produce compositions having a high volatility. In the manufacture of dopes, lacquers and the like, in addition to low boiling solvents such as those mentioned above, and the softeners or plasticizers of the present invention, other medium or high boiling solvents or plasticizers may be incorporated, for example triacetin, diethyl phthalate, dibutyl phthalate, sulphonamides, for example alkylated xylene sulphonamides, sulphonanilides, tartrates, for instance dibutyl tartrate, diphenylol propane, triphenyl phosphate and tricresyl phosphate (both of which are preferably used in conjunction with sulphonamides, tartrates or other highly compatible plasticizers), or other phenolic plasticizers. Among medium boiling solvents which may be used may be mentioned ethyl lactate, diacetone alcohol and tetrachlorethane. Diluents, for example benzene, toluene, xylene or other relatively cheap hydrocarbons or non-solvents for the cellulose derivatives may be incorporated in the dopes, varnishes, lacquers, spinning solutions or the like within the range of tolerance of such solutions. The above cellulose derivative compositions may contain any other desired constituents, for instance dyestuffs, pigments, fillers or resins, for example the natural and synthetic resins already referred to. Further the compositions may include substances adapted to reduce flammability, as, for example, halogenated and particularly brominated organic compounds, for instance brominated acidylated amines, e. g. tribrom-acetanilide. Such substances may themselves be plasticizers, as is the case with the tribrom-acetanilides, in which case they may be used either alone or in conjunction with other plasticizers such as those mentioned above.

When the compounds of the present invention are used in the manufacture of artificial filaments, ribbons, films and the like they will in general be employed in conjunction with relatively low boiling solvents, for example acetone or mixtures of acetone with alcohol, or methylene chloride or ethylene chloride and alcohol. As the compounds of the present invention are in general relatively high boiling substances which may be solid at ordinary temperatures it is desirable that they should constitute a relatively small proportion of the total solvent, particularly in the case of dry spinning processes. When wet spinning is employed, their high boiling points are relatively immaterial provided that they are liquid under the conditions prevailing, and they may constitute the solve solvent present in the spinning solution, though even in this case it is usually preferable to employ lower boiling solvents in addition. Further, as is mentioned above, the compounds of the present invention may be employed in coagulating baths, whether or not they are also present in the spinning solution, according to the processes described in U. S. Patent No. 1,467,493 and U. S. applications S. Nos. 402,785 and 418,414, or they may be employed in subsequent treatment baths such as are described in U. S. application S. No. 402,785.

When the compounds of the present invention are employed in the production of plastics and moulding powders, for which purposes on account of their relatively low volatility they are particularly suitable, they may be incorporated in the cellulose derivative or other base by any suitable method. For example, they may be dissolved or suspended in a suitable medium which may be either a solvent or a non-solvent for the cellulose derivative or other base and may be sprayed on to such base, the mass being then worked up on malaxating rollers in the usual manner and excess solvent removed, either with or without heating. Alcohol or a mixture of benzene and alcohol is a very suitable medium for bringing about incorporation of the compounds of the present invention in the plastic masses or moulding powders.

In addition to being of value in the working up of cellulose esters and ethers into any desired products as described above, the softening agents and plasticizers of the present invention are also valuable for the treatment of already formed articles made of or containing cellulose derivatives, for example filaments, yarns, threads, ribbons, films, fabrics and the like. Such treatments may have various objects. For example the agents of the present invention may be utilized to relustre fabrics or other materials containing cellulose acetate or other organic esters or ethers which have been delustered by the action of moist steam or of hot aqueous media, and reference is made in this connection to U. S. Patent No. 1,808,098. Moreover the agents may be employed to diminish or eliminate the tendency of woven fabrics to slip or of warp or circular knitted fabrics to split or ladder as described, for example, in U. S. application S. No. 152,516 filed 3rd December, 1926, and to improve the pliability or extension of filaments, threads or the like made of or containing cellulose derivatives and particularly to improve the knotting properties of comparatively thick filaments or artificial horsehair. Preferably, treatments designed to improve the extension or pliability are carried out in the absence of tension or under light tension so that the materials are able to shrink, and such treatment is particularly important in relation to the treatment of filaments and the like of low extension produced by wet spinning processes or by the stretching of dry spun products. Such shrinking processes are described broadly in U. S. application S. No. 611,240 filed 13th May, 1932.

The compounds of the present invention may also be employed for the purpose of improving the tenacity of filaments, threads, yarns and the like containing cellulose acetate or other cellulose derivatives. For this purpose filaments or other products during or subsequent to softening with the compounds of the present invention either alone or in the presence of other solvents, swelling agents, or diluents, are subjected to a stretching operation. Alternatively, instead of treating the already formed materials with the compounds of the present invention, such compounds may be incorporated in suitable proportions in the spinning solutions from which the materials are obtained. The stretching operation may be applied in a single stage, preferably gradually, or in a number of stages, as described for example in U. S. application S. No. 573,424 filed 6th November, 1931. The stretching may be carried out upon yarns, hanks and the like as described in U. S. Patent No. 1,709,470, or upon materials in the course of their travel from one point to another as described in U. S. application. S. No. 378,684 filed July, 1929. Further, a number of filaments in the form of a warp may be stretched as a whole, as described in U. S. application S. No. 602,844 filed 2nd April, 1932.

Again, the compounds of the present invention may be employed in the production of sizes and similar compositions employed to facilitate textile operations such as winding, winding and twisting, beaming and the like, and such sizes may, if desired, contain other compounds, for example thickening agents such as polymerized vinyl compounds, oxidized linseed oil or other drying oils.

The compounds of the present invention are also of value in effecting or assisting the absorption of various liquid or solid materials by filaments, yarns, threads, fabrics and the like containing cellulose esters or ethers. Such products may, for example, be treated with the poly-hydroxy alcohol derivatives, either during or before treatments adapted to dye, print, discharge, load, mordant or apply delustering compounds to the materials. Many solid compounds, for example, have little or no affinity for cellulose acetate or other cellulose derivatives, and by means of the compounds of the present invention such substances may be incorporated in the materials by dyeing, printing, stencilling or mechanical impregnation methods. Amongst such substances may be mentioned certain basic dyestuffs having relatively little affinity particularly in printing processes, acid wool and direct cotton dyestuffs, certain vat dyestuffs, white or coloured pigments, for example titanium dioxide and certain discharges, for example formaldehyde-sulphoxylate discharges. Moreover, by the use of the compounds of the present invention the steaming or ageing treatment which it is customary to employ to fix the dyestuff or other agent in the material in printing and similar operations may be omitted, simple drying of the materials to which printing pastes or similar compositions containing the compounds of the present invention have been applied being sufficient to effect fixation.

In the application of the agents of the present invention to already formed products made of or containing cellulose acetate or other organic esters or ethers of cellulose, they may be employed as such or where their solvent or softening power is too great they may be mixed with suitable diluents, for example hydrocarbon diluents of the aliphatic, aromatic or cyclo-aliphatic series, ethers, alcohols, water, or the like. Furthermore they may of course be mixed with other solvents.

The agents of the present invention are particularly important in relation to the manufacture of artificial silk, ribbons, films, dopes, lacquers, plastics, moulding powders and the like, and the treatment of filaments, fabrics and other formed products of cellulose acetate, but they may also be applied to the manufacture and treatment of similar products of cellulose formate, cellulose propionate, cellulose butyrate, nitro-acetate (of low nitrogen content) and other organic esters of cellulose, cellulose nitrate, ethyl, butyl or benzyl celluloses and other cellulose ethers or mixed ethers, and mixed ether-esters, e. g. oxy-ethyl cellulose acetate and ethyl cellulose acetate. As is mentioned above, they may also be applied in the production of compositions containing resins or other substances capable of being employed as lacquer bases, for example compositions containing polymerized vinyl acetate or other polymerized vinyl compounds.

The following examples are given by way of illustration only and it is to be clearly understood that they do not limit the invention in any way:—

Example 1

100 parts of an alcohol-benzene mixture containing 30–35 parts of the compound obtained by the condensation of benzaldehyde and erythritol is sprayed or otherwise incorporated with about 100 parts of acetone-soluble cellulose acetate. The mass is worked up as usual on malaxating rollers, excess solvent being removed during or after malaxation, with or without heating, and a plastic mass is obtained which may be moulded into sheets, rods, blocks or other articles which may be seasoned as usual.

Example 2

The following composition may be employed as a lacquer for coating articles:—

| | Parts |
|---|---|
| Cellulose acetate | 50 |
| Polymerized vinyl acetate | 50 |
| Condensation product of formaldehyde and erythrite | 30 |
| Acetone | 500 |
| Alcohol | 400 |
| Benzene | 100 |

Example 3

The following is a composition which may be employed for similar purposes:—

| | Parts |
|---|---|
| Cellulose acetate | 100 |
| Diphenylol propane formaldehyde resin | 20 |
| Diphenylol propane | 20 |
| Condensation product of sorbital and acetone | 20 |
| Acetone | 400 |
| Alcohol | 400 |

Example 4

The following is a lacquer composition containing nitrocellulose:—

| | Parts |
|---|---|
| Nitrocellulose | 100 |
| Diphenylol propane formaldehyde resin | 20 |
| Condensation product of glucose and acetone | 25 |
| Triphenyl phosphate | 25 |
| Acetone | 100 |
| Alcohol | 300 |
| Butyl acetate | 500 |

Example 5

A spinning solution containing 100 parts of cellulose acetate, 350 parts of acetone, 25 parts of water and 25 parts of the cyclic ether obtained by the condensation of erythritol, is spun according to the ordinary dry spinning processes and filaments are obtained which may be stretched to 50 fine denier.

Example 6

A 25% solution of cellulose acetate in acetone is extruded through spinning jets into a coagulating bath consisting of a 20 to 30% aqueous-alcoholic solution of the condensation product obtained from formaldehyde and erythritol. On leaving the coagulating bath the filaments are taken through a guide and wound round a roller rotating at a suitable peripheral speed in order to bring about a stretch. After leaving the feed roller the materials are washed, for example with dilute solution of ethyl lactate, and then dried. If desired the spinning solution itself may also contain a small proportion, for example 2 to 3%, of the erythritol condensation product.

Example 7

Filaments or yarns of cellulose acetate in hank form are soaked for from 5 to 15 minutes in a 40 to 50% alcoholic or aqueous-alcoholic solution of the condensation product of acetone and erythritol and are then stretched, for example to 200% of their original length. Stretching is preferably carried out slowly, and if desired the process may be applied to travelling filaments by providing a bath of suitable length.

Example 8

The following is an example of a composition having a basis of vinyl acetate:—

| | Parts |
|---|---|
| Polymerized vinyl acetate | 100 |
| Diphenylol propane formaldehyde resin | 45 |
| Tricresyl phosphate | 60 |
| Condensation product of erythritol and diethylene glycol | 60 |
| Alcohol | 1000 |

What I claim and desire to secure by Letters Patent is:—

1. A composition of matter containing a cellulose derivative and a cyclic ether obtainable by the condensation of an alcohol containing at least four hydroxy groups with an alcohol containing at least 2 hydroxy groups.

2. A composition of matter containing an organic derivative of cellulose and a cyclic ether obtainable by the condensation of an alcohol containing at least four hydroxy groups with an alcohol containing at least two hydroxy groups.

3. A composition of matter containing cellulose acetate and a cyclic ether obtainable by the condensation of an alcohol containing at least four hydroxy groups with an alcohol containing at least two hydroxy groups.

4. A composition of matter containing cellulose acetate and a cyclic ether obtainable by the condensation of erythritol with diethylene glycol.

5. A composition of matter containing cellulose acetate and a cyclic ether obtainable by the condensation of erythritol with itself.

6. In a process for the manufacture of products comprising derivatives of cellulose, the step of softening said derivatives with the aid of cyclic ethers obtainable by condensing alcohols containing at least four hydroxy groups with alcohols containing at least two hydroxy groups.

7. In a process for the treatment of filaments, threads, yarns, ribbons, and like materials comprising organic derivatives of cellulose, the step of softening the materials with media containing a cyclic ether obtainable by the condensation of an alcohol containing at least four hydroxy groups with an alcohol containing at least two hydroxy groups.

8. In a process for the treatment of filaments, threads, yarns, ribbons, and like materials comprising cellulose acetate, the step of softening the materials with media containing a cyclic ether obtainable by the condensation of erythritol with diethylene glycol.

9. In a process for the treatment of filaments, threads, yarns, ribbons, and like materials comprising cellulose acetate, the step of softening the materials with media containing a cyclic ether obtainable by the condensation of erythritol with itself.

HENRY DREYFUS.